United States Patent

[11] 3,619,620

[72] Inventor Douglas H. Ring
Middletown Township, Monmouth County, N.J.
[21] Appl. No. 756,274
[22] Filed Aug. 29, 1968
[45] Patented Nov. 9, 1971
[73] Assignee Bell Telephone Laboratories, Incorporated
Murray Hill, N.J.

[54] OPTICAL GUIDING APPARATUS COMPRISING AN OPTICAL TRANSMISSION PATH AND CONTROLLERS HAVING DELAY TIMES THAT VARY IN A SELECTED SEQUENCE
5 Claims, 3 Drawing Figs.

[52] U.S. Cl. .......... 250/208, 250/201, 350/96, 356/152
[51] Int. Cl. .......... G01b 11/27, H01j 39/12
[50] Field of Search .......... 250/201, 208, 199, 209, 204; 350/96; 356/152

[56] References Cited

UNITED STATES PATENTS

| | | | |
|---|---|---|---|
| 3,316,800 | 5/1967 | Kibler | 356/152 |
| 3,442,574 | 5/1969 | Marcatili | 356/152 X |
| 3,466,111 | 9/1969 | Ring | 350/54 |
| 3,494,699 | 2/1970 | Gloge | 350/96 X |

OTHER REFERENCES

"Self-aligning Optical Beam Wave Guides," IEEE Journal of Quantum Electronics, Vol. QE- 3, No. 6, page 244; by J. R. Christian, G. Goubeau, and J. W. Mink, U.S. Army Electronics Command, Fort Monmouth NJ

*Primary Examiner*—John Kominski
*Assistant Examiner*—V. Lafranchi
*Attorneys*—R. J. Guenther and Arthur J. Torsiglieri

ABSTRACT: Coordinated control of light beam repositioning elements in an optical guiding apparatus is achieved by stepped controllers having delay times that increase in the downstream order. Such sequences of stepped controllers are separated by linear controllers that are relatively precise but few in number.

INVENTOR
D. H. RING
BY Wilford L. Wisner
ATTORNEY

OPTICAL GUIDING APPARATUS COMPRISING AN OPTICAL TRANSMISSION PATH AND CONTROLLERS HAVING DELAY TIMES THAT VARY IN A SELECTED SEQUENCE

BACKGROUND OF THE INVENTION

This invention relates to optical guiding apparatuses in which the beam position is automatically controlled.

Communication employing modulated laser beams is the subject of a substantial amount of theoretical and applied research. The potential communication bandwidth, and therefore the total communication capacity, possessed by coherent radiation in a light beam is much greater than that of any existing communication facility. Gradually, many components usable in a communication system employing coherent light have been discovered and investigated.

One of the persistent problems remaining as an obstacle to feasible optical communication systems is the lack of a sufficiently reliable transmission system for the modulated optical beam. In unguided transmission systems, snow, rain and fog degrade transmission reliability. In guided transmission, earth movements and variations in ambient temperature gradients can also degrade transmission reliability. In this context, guided transmission refers to protected transmission in an enclosing conduit, and does not imply operation analogous to that of a microwave waveguide. Typically, the transverse dimensions of the conduit are many times the wavelength of light being transmitted. Reflections at the conduit walls are generally undesirable because sufficiently smooth internal surfaces would be too costly. As a result, many arrangements have been proposed for establishing a fine beam and keeping the beam away from the conduit walls, even in the presence of disturbances.

In some recently proposed optical guiding systems, coordination of the corrections and overall stability of the system are assured by programming techniques or similar techniques that enable selected ones of stepping motor circuits to respond to overthreshold light beam position errors.

The complexity that accompanies the wiring of a central programming unit into a communication system can be reduced by a technique disclosed in another recent proposal by substituting for it a digital pulse transmission line and associated logic arrangements. This technique is disclosed in the concurrently filed Pat. application of P. S. Richter (Case 1), Ser. No. 756,092, filed Aug. 29, 1968 and assigned to the assignee hereof. Although simpler and cheaper than a central programming unit, the digital pulse transmission line still involves significant initial costs.

SUMMARY OF THE INVENTION

According to my invention, in a control system for an optical guiding apparatus in which beam repositioning elements are controlled in response to beam position sensors by control circuits, including servomotors, the advantages of coordinated correction are achieved by varying the delay times of successive control circuits from receipt of an error signal to actuation of the repositioning elements, so that corrections tend to occur in a desired sequence. Delay time is that time after the occurrence of an error signal until correction begins. In a preferred stepped control system, the active correction time following the delay time is made as short as possible. The sum of delay time and active correction time will be termed the characteristic repositioning time. It may be seen that the characteristic repositioning times also vary in the desired sequence.

It is one advantage of my invention that such a variation of control circuit characteristic repositioning times may be supplied, at least in part, by the adjustments of the control circuits for providing comparable signal-to-noise ratios within a given series of them. That is, control circuit bandwidth should be decreased as the light beam propagates past successive positions down the guide if a constant signal-to-noise ratio is to be maintained. Reduced control circuit bandwidth corresponds to increased repositioning time. The narrower band circuits also extract less power from the beam for sensing and do not weaken the downstream signal as rapidly as broader band circuits would.

A subsidiary feature of my invention resides in the introduction of at least one linear controller after a sequence of coordinated stepped-control circuits when the characteristic repositioning time of the preceding control circuit has reached a desired maximum limit. The linear controller is provided with an active correction time as small as possible, essentially no delay time, and a relatively small residual error. The sequence of increasing characteristic repositioning times of the coordinated stepped-control circuits can then be resumed again at a value less than the maximum limit. Numerous stepped-control circuit sequences and linear controllers may be employed. While the stepped-control circuits may be numerous, rather imprecise and cheaper than the linear controllers, the linear controllers may be precise but relatively few in number.

BRIEF DESCRIPTION OF THE DRAWING

Further features and advantages of my invention will become apparent from the following detailed description, taken together with the drawing, in which.

DESCRIPTION OF THE ILLUSTRATIVE EMBODIMENT

Figure 1A:
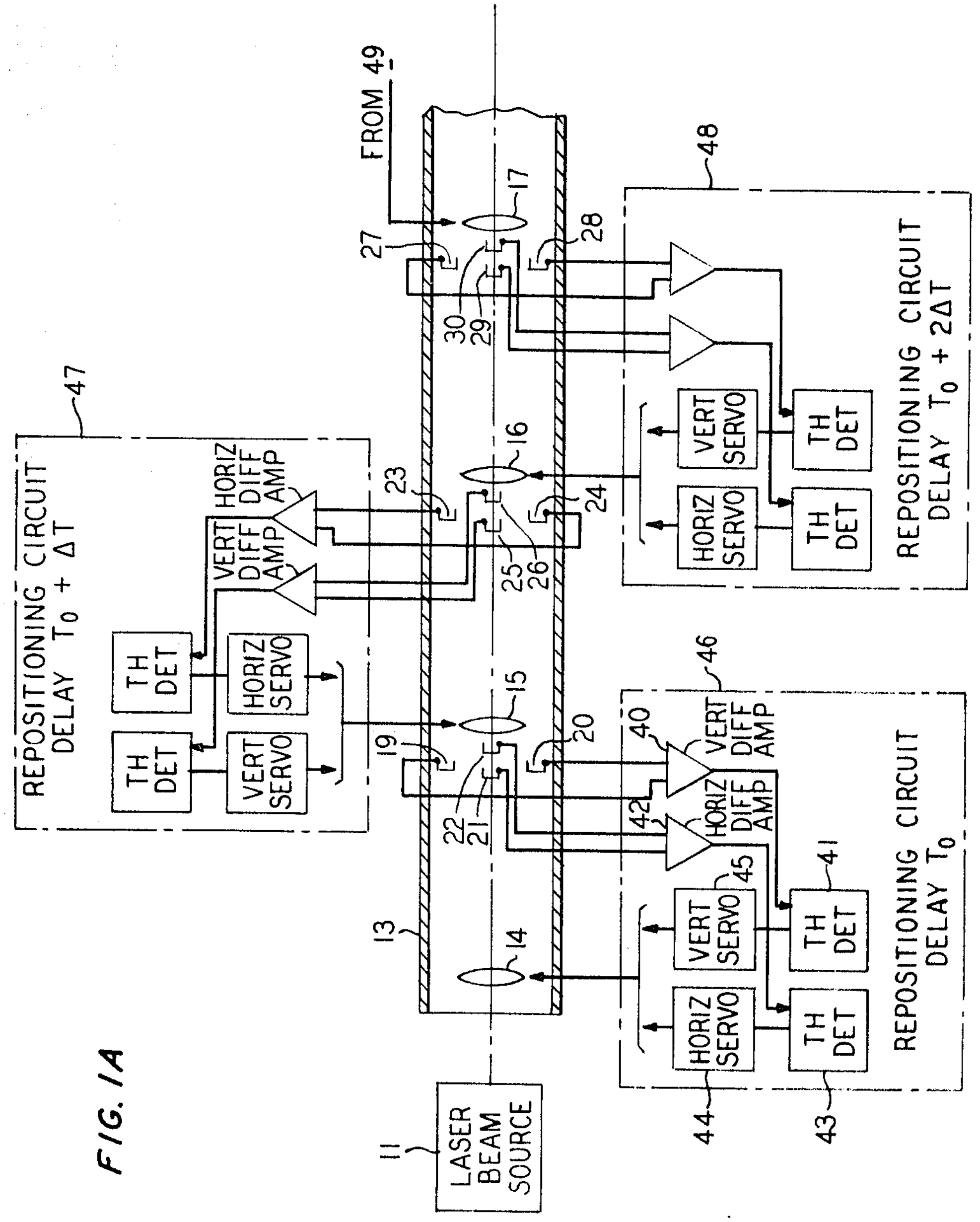
FIGS. 1A and 1B are a partially schematic and partially block diagrammatic illustration of one embodiment of my invention.
Figure 1B:
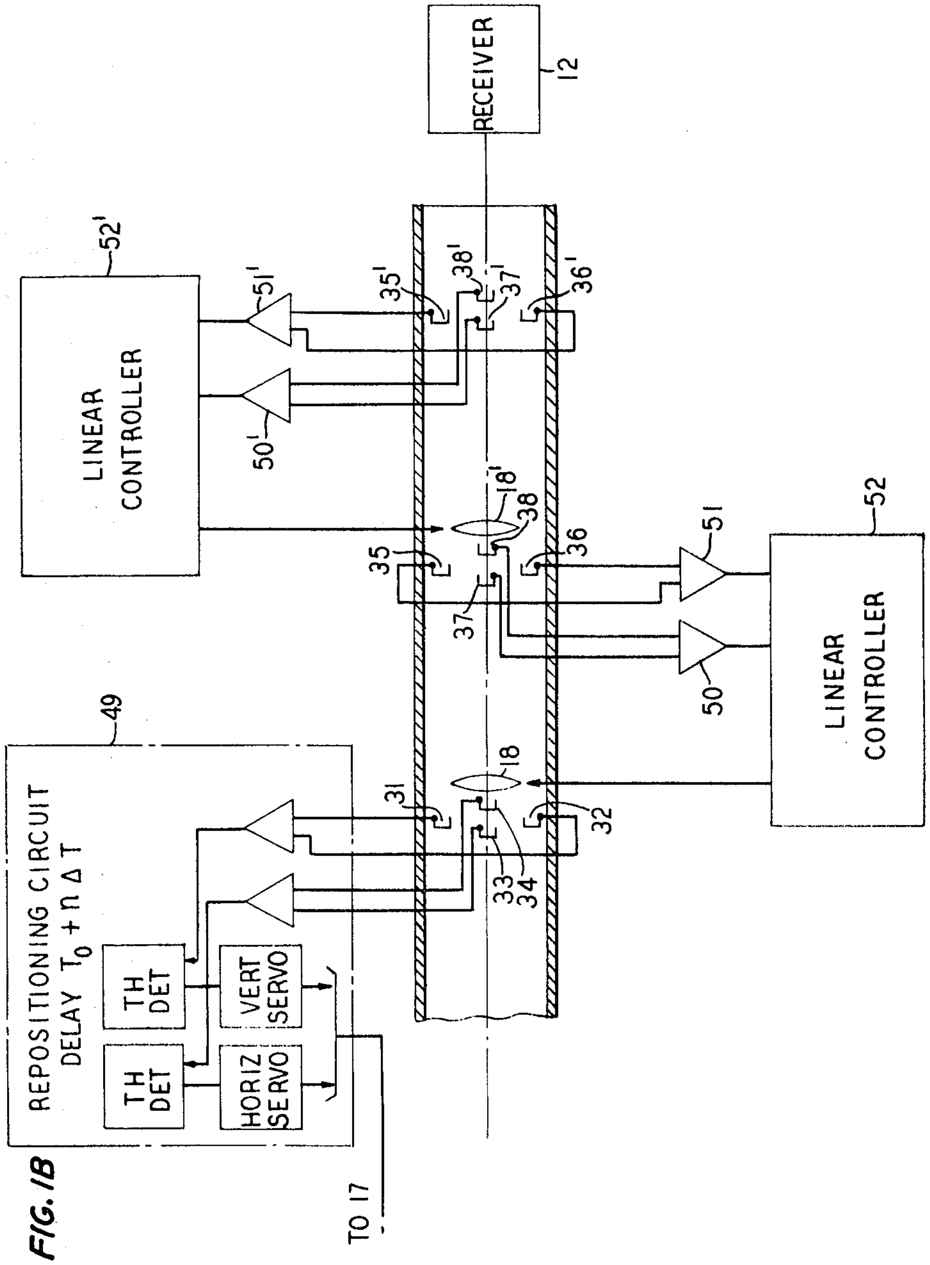

In the embodiment of FIGS. 1A and 1B it is desired to transmit a modulated laser beam from a source 11 to a remote receiver 12 for communication purposes. To avoid the unpredictability of the atmosphere and the weather, transmission occurs in a protective conduit 13, illustratively copper, which has an internal diameter many times the wavelength of the light beam being transmitted.

For purposes of illustration, it will be assumed that the lenses 14, 15, 16, 17, 18 and 18', which serve to focus the laser beam to keep it from spreading to intercept the conduit walls, are movably mounted so that they may also serve as light beam repositioning elements. The need for such light beam repositioning may be occasioned by movements of the earth in which conduit 13 is buried, or by substantial changes in temperature gradients. While conduit 13 will be buried as deeply as possible to minimize changes in temperature gradients and local traffic disturbances, certain residual disturbances are hard to eliminate and can be compensated for by movement of the light beam repositioning elements, for example, the movable lenses 14–18'.

Illustratively, a set of sensors 19, 20, 21 and 22 are positioned symmetrically about the guide axis at a given axial position downstream from lens 14, at the lens position following the lens they control, to sense both horizontal and vertical position errors of the light beam.

Typically, sensors 19, 20, 21 and 22 are located essentially in the plane of the following lens 15. Similar sets of sensors are disposed in similar fashion downstream from lenses 15–18. The vertical position-sensing sensors 19 and 20 are connected to the inputs of a difference amplifier 40. The output amplifier 40 is connected to a first threshold detector 41. Similarly, horizontal beam position-sensing sensors 21 and 22 are connected to the inputs of a difference amplifier 42, the output of which is connected to the threshold detector 43. Threshold detectors 41 and 43 are connected to the vertical-positioning servomotor 45 and horizontal-positioning servomotor 44, respectively. The servomotors 44 and 45 may be digital servomotors of known type which are adapted to move lens 14 in discrete steps in the corresponding transverse direction in conduit 13 (by conventional mechanisms not shown). The difference amplifiers 40 and 42, the threshold detectors 41 and 43 and the digital servomotors 44 and 45 comprised a self-controlled steppedrcontrol circuit 46 illustratively having a delay time for movement of lens 14 which is $T_0$. The time $T_0$ is measured from the receipt of an error signal from the sensors to the start of active correction. This stepped-control circuit 46 is typical of the stepped-control circuits which follow, i.e., those employing digital servomotors. In the embodiment of the drawing, the next following stepped-control circuits 47, 48 and 49 have monotonically increasing delay times in a downstream sequence with respect to the propagation of the light beam. Their active correction times are all made as small as possible by employing high-speed servomotors. Thus the next circuit 47 is just like circuit 46, except that it is adapted to control the position of lens 15 and has a delay time $T_0+\Delta T$. Similarly, repositioning circuit 48 which follows circuit 47 and controls lens 16 has a delay time of $T_0+2\Delta T$. The $n^{th}$ stepped-control circuit 49 which illustratively provides stepped control of lens 17, is like the preceding stepped-control circuits, except for characteristic repositioning time of $T_0+n\Delta T$, where $n$ is an integer one larger than that for the preceding circuit.

Let us assume that $T_0+n\Delta T$ has attained in circuit 49 the maximum delay time that is feasible in the optical guiding apparatus of the drawing.

The next control unit, which is adapted for positioning lens 18, includes the symmetrically disposed sensors 35–38 and the difference amplifiers 50 and 51, all similar to those employed before. But in the place of the typical stepped-control circuit having substantial delay time, a precision high-speed linear controller 52 is employed, and it is followed by a similar linear controller 52′ controlling lens 18′. Such circuits are well-known in the positioning art and may include proportional, integral and derivative control features, all of which are advantageous but relatively expensive compared to the stepped-control circuits 46–49. For example, linear controllers 52 and 52′ may be of the general type disclosed in copending Pat. application of E. A. J. Marcatili, Ser. No. 487,677, filed Sept. 16, 1965 and assigned to the assignee hereof.

If integral control is included in the linear controllers 52 and 52′, the residual light beam positioning error is substantially eliminated in the vicinity of sensors 35′–38′. Another sequence of stepped-control circuits having increasing response times may then be employed thereafter, in view of the relatively low beam position errors that will follow sensors 35′–38′. Similarly a further sequence of stepped-control circuits would be followed by linear controllers including circuits like the linear controllers 52 and 52′).This organization of the optical guiding apparatus can be continued virtually indefinitely until a repeater or receiver 12 intercepts the modulated optical beam.

OPERATION

In operation, assume the first sensors 19–22 sense a position error at the plane of the second correcting lens 15. Then the first correction, by moving the first lens 14, will bring the beam on axis at the first set of sensors. If it is crossing the axis at an angle at the first set of sensors, the second correction, at the first sensor position (lens 15) will correct the beam angle to bring it through the second set of sensors 23 through 26. The beam then is on axis at the second set of sensors and is fully corrected. These corrections occur with increasing delay times in successive step control units. The linear controllers 52 and 52′ remove residual error and enable a new series of step control units with increasing delay times, although with signal-to-noise ratio at a lower level.

DESCRIPTION OF THE INDIVIDUAL COMPONENTS

Laser beam source 11 includes not only a suitable laser which is capable of being modulated but also the means for modulating it in response to an information signal that is to be communicated to receiver 12.

The light beam position sensors 19–38′ are illustratively photosensitive diodes associated with small reflectors disposed to collect a portion of the transmitted beam and focus it upon the associated diodes. The photodiodes and associated reflectors constituting the sensors are mounted in fixed position with respect to conduit 13, and establish the position of the controlled beam. The movement of the lens in the sensor plane with respect to the established beam position alters the angle of the transmitted beam so that it arrives at the center point of the sensor at the next lens-sensor position down the guiding apparatus.

The lenses 14–18′ are typically antireflection coated glass lenses, illustratively confocally disposed and mounted in yokes (not shown) which enable their translation in two orthogonal dimensions normal to the axis of conduit 13. Other feasible beam repositioning elements are movable prisms or reflecting elements that can be tilted to redirect the light beam. Either can be used with fixed focusing lenses.

All of the difference amplifiers in the stepped-control circuits 46, 47, 48, and 49, for example, the amplifiers 40 and 42, are conventional electronic difference amplifiers of the type used in the automatic control art. The threshold detectors, for example, threshold detectors 41 and 43, are electronic circuits capable of generating output voltages of positive and negative polarities and with a symmetrical deadband with respect to positive and negative input voltages. The deadband is twice the threshold voltage for either polarity of the error signal generated in respective amplifiers 40 or 42. The threshold voltage illustratively corresponds to an amount of beam position error which can be compensated by one step of movement of the preceding lens. Other relationships between threshold voltage and the size of a step of movement of a beam repositioner are feasible.

The servomotors, for example, servomotors 44 and 45, are digital servomotors of types well-known in the electronic control art. They will continue to step periodically so long as an input voltage is applied to them. They control horizontal and vertical movements of their associated beam repositioning elements, such as lens 14, through appropriate mechanisms (not shown) coupled to the movable yoke (not shown) in which lens 14 is mounted.

The receiver 12 may include conventional optical demodulation components which are compatible with the modulation apparatus in source 11.

Figure 2:
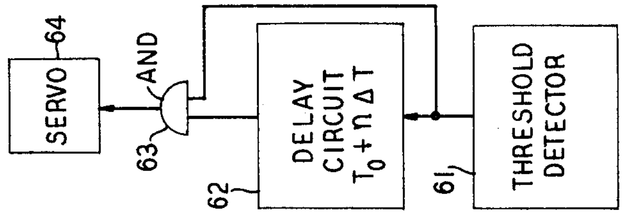
FIG. 2 shows in block diagrammatic form an illustrative technique for achieving the desired repositioning delay time.

The respective delay times of the circuits 46–49 are illustratively introduced into the respective servomotors contained in those repositioning circuits by the arrangement shown in FIG. 2. The output of a threshold detector 61 is applied simultaneously to a delay circuit 62 providing the desired delay time and to one input of AND gate 63. The output of AND gate 63 is connected to digital servomotor 64. The delay circuit 62 may be a timer or a delay line; and its output is connected to the other input of the AND gate 63. If the error disappears before the delay period is over, no erroneous correction occurs. Correction continues only while signals are simultaneously applied to and derived from the delay circuit 62.

It should be apparent that many other implementations and modifications of my invention may be achieved by those skilled in the automatic control art.

The specific description above refers to a single modulated light beam transmitted from the source to the receiver. The control system described will also work for a system utilizing space multiplex where a bundle of resolvable beams is substituted for the single beam. The focusing and control problems and requirements for a bundle are the same and the control system will work as described with suitable larger lenses and sensors.

What is claimed is:

1. An optical guiding apparatus comprising a conduit through which a beam of optical radiation is to be transmitted, a plurality of means disposed within said conduit for repositioning said beam within said conduit, a plurality of means for sensing position errors of said beam substantially simultaneously at a plurality of locations in such conduit, and a plurality of self-controlled means coupled to said repositioning means from respective sensing means for adjusting said repositioning means to correct said position errors, said plurality of repositioning means together with said coupling adjusting means having characteristic repositioning times varying in a selected sequence.

2. An optical guiding apparatus according to claim 1 in which the plurality of the adjusting means comprises a first plurality of stepped-control circuits, a linearly responsive adjusting means following the first plurality of stepped-control circuits and a second plurality of stepped-control circuits following said linearly responsive adjusting means.

3. An optical guiding apparatus of the type comprising a conduit through which a beam of optical radiation is to be transmitted, a plurality of means disposed within said conduit for repositioning said beam within said conduit, and a plurality of means disposed in said conduit for sensing transverse position errors of said beam substantially simultaneously at a plurality of axial positions in said conduit, said sensing means being coupled to said repositioning means, said plurality of repositioning means together with said plurality of coupled sensing means being self-controlled and characterized by respective delay times for starting repositioning, which respective delay times increase in the downstream order with respect to the direction of propagation of said beam.

4. An optical guiding apparatus according to claim 3 in which the plurality of means for repositioning the beam comprise a plurality of repositioning elements within the conduit, and means for providing stepped movement of said repositioning elements.

5. An optical guiding apparatus according to claim 1 in which a plurality of the adjusting means each include a delay circuit adapted to provide a major portion of the characteristic repositioning time and a logic circuit coupled to said delay circuit and adapted to continue adjustment of said delay circuit and adapted to continue adjustment of the coupled repositioning means only while signals are simultaneously applied to and derived from said delay circuit.

* * * * *